March 4, 1930. H. A. SHELBY 1,749,090
APPARATUS FOR OBTAINING CRIMINAL CONFESSIONS
AND PHOTOGRAPHICALLY RECORDING THEM
Filed Aug. 10, 1927 2 Sheets-Sheet 1
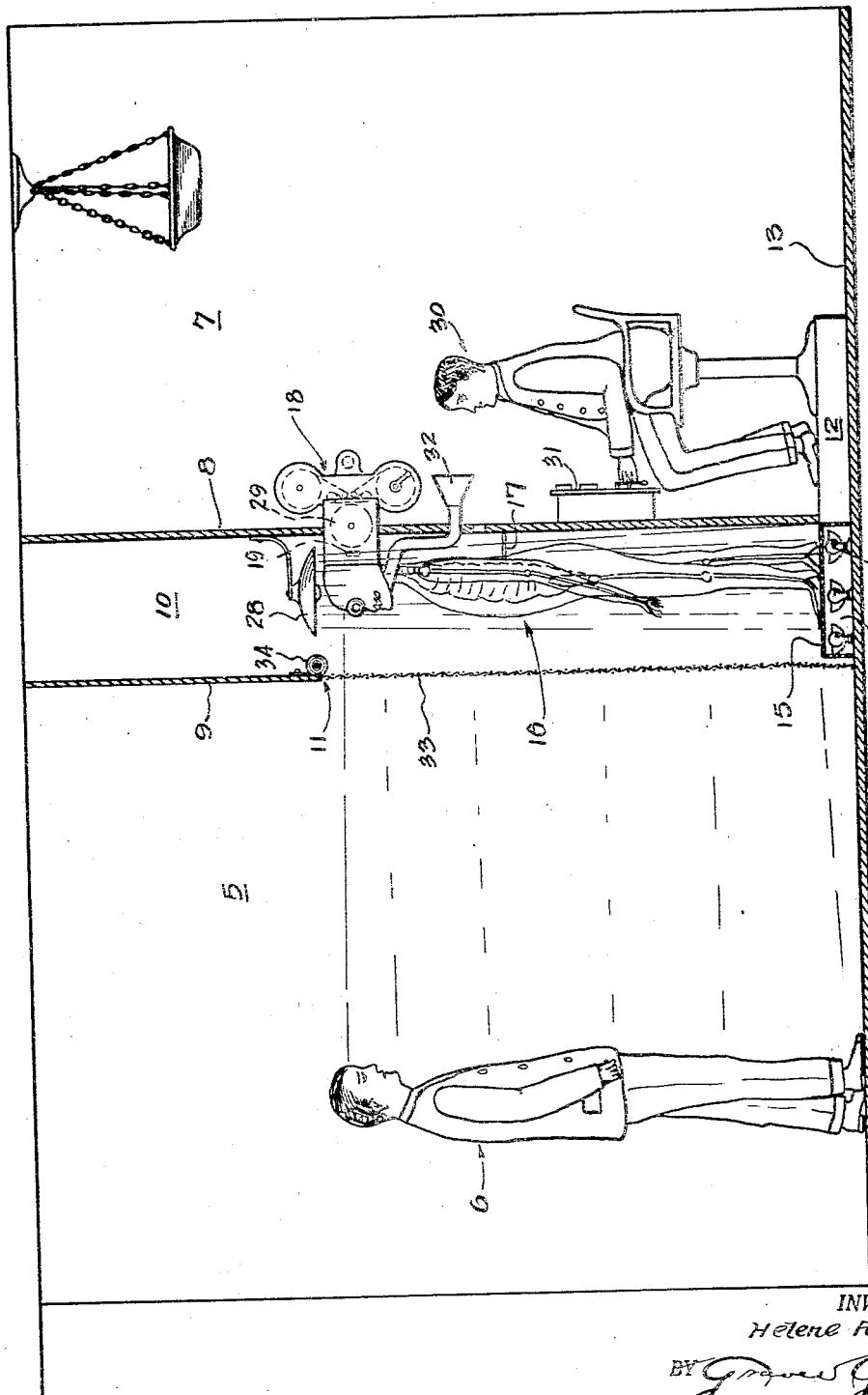
INVENTOR.
Helene A. Shelby.
BY
ATTORNEY.

March 4, 1930.  H. A. SHELBY  1,749,090
APPARATUS FOR OBTAINING CRIMINAL CONFESSIONS
AND PHOTOGRAPHICALLY RECORDING THEM
Filed Aug. 10, 1927   2 Sheets-Sheet 2
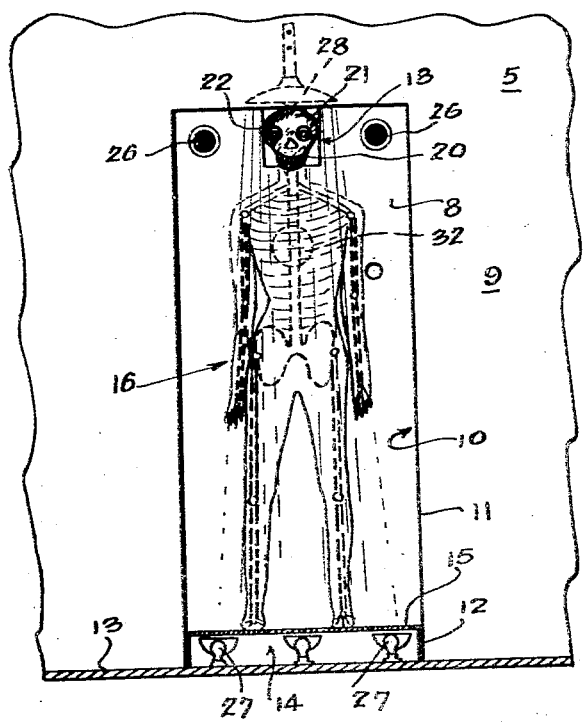
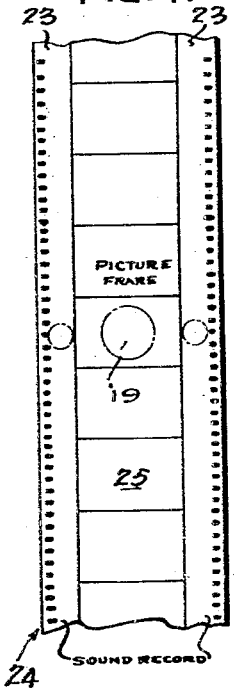
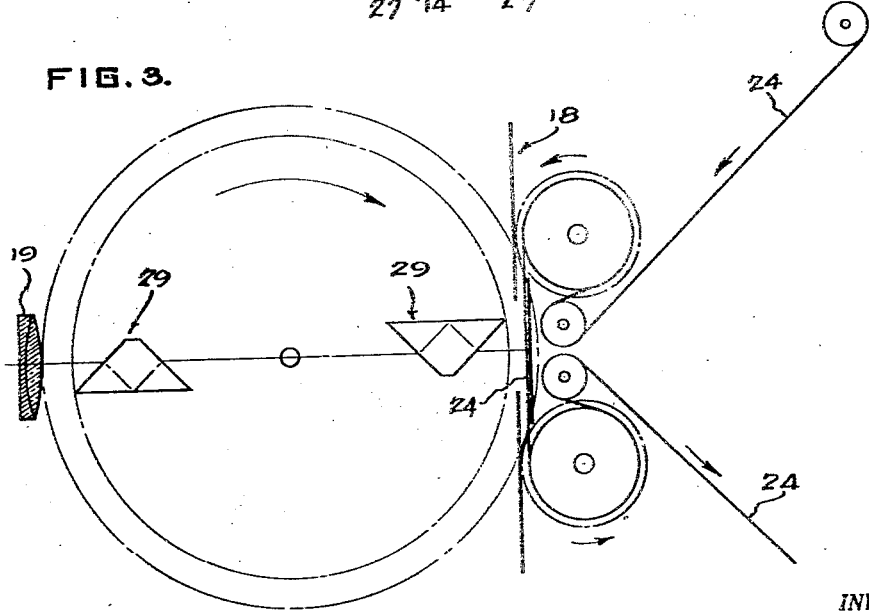
INVENTOR.
Helene H. Shelby.
BY
ATTORNEY.

Patented Mar. 4, 1930

1,749,090

UNITED STATES PATENT OFFICE

HELENE ADELAIDE SHELBY, OF OAKLAND, CALIFORNIA

APPARATUS FOR OBTAINING CRIMINAL CONFESSIONS AND PHOTOGRAPHICALLY RECORDING THEM

Application filed August 10, 1927. Serial No. 212,102.

The present invention relates to a new and useful apparatus for obtaining confessions from culprits, or those suspected of the commission of crimes, and photographically recording these confessions, in the form of sound waves, in conjunction with their pictures, depicting their every expression and emotion, to be preserved for later reproduction as evidence against them.

The primary object of my invention is the provision of an apparatus for the creation of illusory effects calculated to impress the subject with their being of a supernatural character and to so work upon his imagination as to enable an inquisitor operating in conjunction with the recording system to obtain confessions and graphically record them by light action under the control of electric impulses governed by varying intensities of sound waves.

An additional object of my invention is the provision of an apparatus for photographically recording both pictures and sounds simultaneously as applied to the confessions of criminals, for their later reproduction as a bar to future retractions.

It is a well known fact in criminal practice that confessions obtained initially from those suspected of crimes through ordinary channels, are almost invariably later retracted, or repudiated, by the criminal with the charge that these confessions had been obtained through intimidation, or under duress.

The accompanying drawings illustrate the apparatus as adapted to be employed in carrying out my method of procuring and recording these confessions of guilt to be later reproduced as evidence.

Figure 1 is a side elevation illustrative of a structure divided into two chambers, one chamber of which is darkened to provide quarters in which the suspect is confined while being subjected to examination, the other chamber being provided for the examiner, the two chambers being separated from each other by a partition which is provided with a panel upon one side of which is mounted a figure in the form of a skeleton, the said skeleton having the rear portion of the skull removed and the recording apparatus inserted therein as shown;

Figure 2 is a front view looking into the enclosure in which the skeleton is mounted and as seen looking from the suspect's examination quarters.

Figure 3 is a schematic view illustrating the method of photographically recording the prisoner's features and voice; and Figure 4 is a view illustrating a fragment of film having a central picture strip and side strips for the recordation of the prisoner's voice.

My apparatus for obtaining confessions of guilt from criminals undergoing examination comprises a novel combination of well known elements, arranged in such manner and combination as to produce, when operated, a state of mind calculated to cause him, if guilty, to make confession thereof, the apparatus further operating to record photographically his every expression and emotion, while, at the same time, simultaneously recording his examiner's questions and the replies thereto.

The elements comprising my apparatus consist of a dark enclosure 5 constituting the chamber in which the suspect undergoes examination in which the subject 6 is placed. This chamber 5 is separated from the examiner's chamber 7 by a panel 8 and a partition 9, said panel and partition bearing an intermediate aperture 10, which aperture is provided with a framed opening 11.

A platform 12 is mounted upon the floor 13 and extends under the panel 8 and consists of a light chamber 14 having a glass top 15, in which is mounted a plurality of electric lights having reflectors adapted to reflect the light upwardly through and about a skeleton 16 mounted upon said glass top, said skeleton being supported by a brace 17 extending from the panel 8.

The rear portion of the skull of the skeleton is removed and a camera casing 18 is mounted in the panel 8 extending into the skull, said camera being preferably of the continuously-moving film-type and having provisions for simultaneously recording pictures and sound waves, or reproducing these, as may be desired or required, the said camera having an objective 19 adapted to register with the nose, or other opening, 20 in the skull. The eye-sockets 21 are provided with bulbs 22 adapted to impress different light intensities upon the margins 22 and 23 of the film 24, the central section 25 of the film being arranged to receive the pictures, the variations in the light intensities of the bulbs 22 being governed by means of the microphones 26, and selenium cells (not shown), which are included in the light circuit and tend to cause the fluctuations of the current to vary the intensity of the light for sound recording purposes, the density of the light impression upon the film varying with the intensity of the light thus transmitted.

The skeleton 16 is arranged in front of the panel 8 with its feet resting upon the glass top 15 of the light chamber 14, the lights 27 mounted in this chamber being adapted to flood the entire skeleton from the feet up, while a second source of light 28 mounted upon the panel 8 over the skull of the skeleton, as shown in Figure 1, is adapted for additional flooding from an opposite direction, the purpose being to produce the appearance of an "apparition" having a translucent outer, or astral body, and a diaphanous veiling constituting the so-called aura, the lighting being of a character adapted to flood with a ghostly light and to bring out clearly the skeleton's outlines. To add to the mystification, the bulbs 22, forming the eyes of the skeleton, will be caused to "blink," upon the subject's replying to questions while under examination, this blinking resulting from the variations in the sound waves as governed by the microphones controlling the electric circuits.

It is immaterial as to whether the objective 19 is positioned to direct the rays upon the revoluble prism system 29 of the camera 18, or to receive the rays as reflected thereby, though, in this construction it has been elected to place it in a position for directing rays upon it, as has been the positioning, also, of the electric light bulbs. The light bulbs 22 are of either the usual evacuated order, or gas filled, but differ in that one-half of the bulb is of blue color, while the other half is of red, to meet the double requirements of the emitted light, the blue being used as better adapted for the recordation of the sound waves, and the red for the purpose of imparting to the eyes of the skeleton an unnatural ghastly glow.

The camera and projector may be operated by means of a small motor under the direct control of the operator 30, who manipulates the various controls mounted upon a suitable switch board carried by the panel 8, the various light circuits being also controlled by switches mounted upon the board 31.

A megaphone 32 is arranged for the convenience of the examiner, in questioning a suspect, the outer end of said megaphone being connected to the skull of the skeleton in such manner that the voice of the operator appears to come from the mouth of the skeleton.

A screen 33 covers the framed opening 11 between the subject and the skeleton, this screen being adapted to be darkened by a roll-curtain 34 mounted on the partition 9.

In applying my apparatus to the obtaining and recordation of confessions, the operation is substantially as follows:

Assuming all the elements pertaining to the system to be in readiness, with the suspect in his alloted place in the chamber 5 and the examiner 30 at his controllers in the chamber 7, the current for the divers lights for the creation of the lighting effects previously described is switched on, the motor started, and the curtain 34 raised to expose the skeleton to the view of the suspect, who is thereafter subjected to a cross-examination, being photographed the while upon the central section of a continuously moving film and having both the questions propounded by his examiner and his answers thereto simultaneously and similarly recorded upon either margin of the film bearing also the suspect's portrait, to be preserved as future evidence against him, in the form of reproductions of both pictures and sounds in the usual manner.

Having thus described my method of obtaining confessions from those criminally suspected and photographically recording these confessions, together with other pertinent matter connected therewith, for later reproduction as evidence, I claim, and desire to secure by Letters Patent:

1. A device of the character described, comprising a chamber divided into compartments having partitioning means therebetween, an "apparition" disposed in one of said compartments and supported by said partitioning means, said "apparition" comprising a skeleton, a transparent envelop therefor constituting its body, means comprising an electrical circuit and a plurality of electric bulbs for suitably lighting said body to produce ghastly effects, electric bulbs in the sockets of the cranium of said skeleton, the said bulbs having exteriorly the appearance of eyeballs when illuminated, a camera within said cranium adapted to photographically and simultaneously record both scenes and words, and an electric circuit for suitably lighting the bulbs of the cranium, said circuits being controlled by switches carried by a switch-board located in the rear of said partitioning means.

2. An apparatus of the class described, comprising a chamber divided into compartments having partitioning means therebetween, an "apparition" disposed within one of said compartments and supported by said partitioning means, said "apparition" comprising a skeleton, a transparent envelop therefor constituting its body and a diaphanous shrouding enclosing said body, a hollow base for the support of said skeleton, comprising a box-like structure provided with a transparent top and having arranged interiorly thereof electric globes with properly supported reflective elements, and a roll-curtain in one of said compartments adapted when dropped to screen said "apparition."

3. A device of the class described, comprising a chamber divided into compartments having partitioning means therebetween, an "apparition" disposed in one of said compartments and supported by said partitioning means, said "apparition" comprising a skeleton, a transparent envelop therefor constituting its body and a diaphanous shrouding enclosing said body, a hollow base for the support of said skeleton, comprising a box-like structure provided with a transparent top and having arranged interiorly thereof electric globes with properly supported reflective elements, a roll-curtain arranged in front of said skeleton and adapted when dropped to screen said "apparition" and a megaphone supported by said partitioning means and connecting the interior of one of said compartments with the interior of the cranium element of said skeleton.

In testimony whereof I have affixed my signature.

HELENE ADELAIDE SHELBY.